(12) United States Patent
Saab et al.

(10) Patent No.: US 9,855,815 B2
(45) Date of Patent: Jan. 2, 2018

(54) DEVICE FOR THE THERMAL MANAGEMENT OF A CABIN AND OF A DRIVETRAIN OF A VEHICLE

(71) Applicant: Valeo Systemes Thermiques, Le Mesnil Saint Denis (FR)

(72) Inventors: Samer Saab, Paris (FR); Bernard Aoun, Paris (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 581 days.

(21) Appl. No.: 14/380,397

(22) PCT Filed: Feb. 11, 2013

(86) PCT No.: PCT/EP2013/052624
§ 371 (c)(1),
(2) Date: Aug. 22, 2014

(87) PCT Pub. No.: WO2013/124173
PCT Pub. Date: Aug. 29, 2013

(65) Prior Publication Data
US 2015/0034272 A1  Feb. 5, 2015

(30) Foreign Application Priority Data
Feb. 24, 2012  (FR) .................... 12 51729

(51) Int. Cl.
*B60H 1/00* (2006.01)
*B60H 1/22* (2006.01)
*B60H 1/32* (2006.01)

(52) U.S. Cl.
CPC ..... *B60H 1/00271* (2013.01); *B60H 1/00278* (2013.01); *B60H 1/00385* (2013.01);
(Continued)

(58) Field of Classification Search
CPC ............ B60H 1/00271; B60H 1/00278; B60H 1/00385; B60H 1/2215; B60H 1/2221; B60H 1/3222
(Continued)

(56) References Cited

U.S. PATENT DOCUMENTS 6,032,869 A * 3/2000 Ito ..................... B60H 1/00314
165/103
9,604,627 B2 * 3/2017 Yamanaka ............ B60W 20/00
(Continued)

FOREIGN PATENT DOCUMENTS

| FR | 2 949 386 A1 | 3/2011 |
| WO | WO 2011/076199 A1 | 6/2011 |
| WO | WO 2012/021104 A1 | 2/2012 |

OTHER PUBLICATIONS

International Search Report for Application No. PCT/EP2013/052624 dated Mar. 15, 2013, 7 pages.
(Continued)

*Primary Examiner* — Ljiljana Ciric
(74) *Attorney, Agent, or Firm* — Howard & Howard Attorneys PLLC (57) ABSTRACT

A device (1) for the thermal management of a vehicle cabin and of at least one electric component (13) of an electric drivetrain of said vehicle includes a heat-transfer fluid circuit (3) through which there flows a heat-transfer fluid. The device (1) also includes at least —a first heat-transfer fluid loop (4) made up of at least a first pump (7), a heat source and an internal heat exchanger (9) able to heat the cabin, and —a second heat-transfer fluid loop (5) in parallel with the first loop (4) and interconnected therewith by a first interconnection device (6). The second loop (5) including at least a first exchanger (11) of the electric component (13), characterized in that the heat source is able to heat the
(Continued)

heat-transfer fluid circulating in the first heat-transfer fluid loop (4) and/or in the second heat-transfer fluid loop (5).

17 Claims, 4 Drawing Sheets

(52) U.S. Cl.
CPC ......... B60H 1/2215 (2013.01); B60H 1/2221 (2013.01); B60H 1/3222 (2013.01); *B60H 2001/00307* (2013.01)

(58) Field of Classification Search
USPC .................. 165/41, 42, 43, 202, 203, 204
See application file for complete search history.

(56) References Cited

U.S. PATENT DOCUMENTS

| | | | |
|---|---|---|---|
| 9,623,719 B2 * | 4/2017 | Hatakeyama | B60H 1/2215 |
| 9,631,872 B2 * | 4/2017 | Lombardo | F28D 7/0008 |
| 9,758,009 B2 * | 9/2017 | Kardos | B60H 1/00278 |
| 9,758,012 B2 * | 9/2017 | Johnston | B60H 1/00278 |
| 2001/0040061 A1 * | 11/2001 | Matuda | B60H 1/00278 180/68.2 |
| 2002/0185546 A1 * | 12/2002 | Homan | B60H 1/00735 237/2 A |
| 2006/0032623 A1 * | 2/2006 | Tsubone | B60H 1/00492 165/202 |
| 2006/0060340 A1 * | 3/2006 | Busse | B60H 1/00278 165/202 |
| 2008/0196877 A1 * | 8/2008 | Zeigler | B60H 1/00907 165/202 |
| 2009/0020620 A1 * | 1/2009 | Douarre | B60H 1/00278 237/12.3 R |
| 2009/0071428 A1 * | 3/2009 | Kamiyama | B60H 1/00314 123/142.5 R |
| 2010/0012295 A1 | 1/2010 | Nemesh et al. | |
| 2010/0155018 A1 | 6/2010 | Goenka et al. | |
| 2011/0048671 A1 * | 3/2011 | Nishikawa | B60H 1/00885 165/42 |
| 2011/0113800 A1 * | 5/2011 | Sekiya | B60H 1/00278 62/151 |
| 2011/0296855 A1 * | 12/2011 | Johnston | B60L 3/0046 62/79 |
| 2012/0060522 A1 * | 3/2012 | Markowitz | B60H 1/005 62/79 |
| 2012/0174602 A1 * | 7/2012 | Olivier | B60H 1/004 62/79 |
| 2012/0205088 A1 * | 8/2012 | Morisita | B60H 1/00921 165/202 |
| 2012/0216983 A1 * | 8/2012 | Bennion | B60H 1/00907 165/41 |
| 2012/0241139 A1 * | 9/2012 | Katoh | F28D 1/0426 165/202 |
| 2012/0247716 A1 | 10/2012 | Galtz et al. | |
| 2013/0074525 A1 * | 3/2013 | Johnston | B60H 1/00278 62/56 |
| 2013/0075245 A1 * | 3/2013 | Frick | B01D 1/0047 203/22 |
| 2013/0175022 A1 * | 7/2013 | King | B60H 1/00392 165/202 |
| 2013/0206360 A1 * | 8/2013 | Zhang | B60H 1/00278 165/42 |
| 2013/0269911 A1 * | 10/2013 | Carpenter | F28D 1/0408 165/104.13 |
| 2013/0306302 A1 * | 11/2013 | Osaka | B60H 1/00642 165/287 |
| 2014/0216689 A1 * | 8/2014 | Lombardo | F28D 7/0008 165/104.14 |
| 2014/0290296 A1 * | 10/2014 | Katoh | F28D 1/0452 62/238.7 |
| 2014/0374060 A1 * | 12/2014 | Labaste Mauhe | B60H 1/00278 165/62 |
| 2015/0122472 A1 * | 5/2015 | Higuchi | B60H 1/00849 165/202 |
| 2015/0129161 A1 * | 5/2015 | Nishikawa | B60K 11/02 165/43 |
| 2015/0217623 A1 * | 8/2015 | Hatakeyama | B60L 1/003 165/42 |
| 2015/0273976 A1 * | 10/2015 | Enomoto | B60K 6/22 165/202 |
| 2016/0023532 A1 * | 1/2016 | Gauthier | B60L 1/06 62/243 |
| 2016/0116197 A1 * | 4/2016 | Takeuchi | F25B 5/02 62/276 |
| 2016/0258266 A1 * | 9/2016 | Frick | B01D 3/007 |
| 2016/0297280 A1 * | 10/2016 | Riederer | B60H 1/00278 |
| 2016/0318499 A1 * | 11/2016 | Yamanaka | B60W 10/06 |
| 2016/0332505 A1 * | 11/2016 | Yamanaka | B60L 11/18 |
| 2017/0021698 A1 * | 1/2017 | Hatakeyama | F25B 7/00 |
| 2017/0182864 A1 * | 6/2017 | Heyl | B60H 1/00385 |

OTHER PUBLICATIONS

Machine-Assisted English language abstract and Machine-Assisted English language translation for FR 2 949 386 extracted from espacenet.com database on Oct. 6, 2014, 25 pages.

English language abstract for WO 2011/076199 extracted from espacenet.com database on Oct. 6, 2014, 2 pages.

* cited by examiner

DEVICE FOR THE THERMAL MANAGEMENT OF A CABIN AND OF A DRIVETRAIN OF A VEHICLE

CROSS-REFERENCE TO RELATED APPLICATIONS

This application is the National Stage of International Patent Application No. PCT/EP2013/052624, filed on Feb. 11, 2013, which claims priority to and all the advantages of French Patent Application No. FR 12/51729, filed on Feb. 24, 2012, the content of which is incorporated herein by reference.

BACKGROUND

The technical field of the present invention is that of vehicles, the movement of which is provided by at least one electric motor. This field therefore includes electric vehicles, i.e. vehicles that are driven solely by an electric motor, and hybrid vehicles, i.e. vehicles that are driven by an electric motor and by an internal combustion engine. More particularly, the object of the invention is the system for the thermal conditioning of the passenger compartment of such a vehicle, as well as the thermal conditioning of at least one electrical component that makes up the electric power train of the vehicle.

The depletion of petroleum resources has led automobile manufacturers to develop vehicles that operate on the basis of new energy sources. One solution that represents an interesting alternative is that of the vehicle being driven using electric power. However, the absence of an internal combustion engine, or the unavailability of the internal combustion engine in hybrid vehicles, deprives the vehicle of an energy source for providing the thermal conditioning of the passenger compartment, particularly heating.

In order to overcome this drawback, the use of a conventional air-conditioning loop actuated by a compressor has been proposed, with the circulation of the coolant being organised so as to heat or cool an airflow fed into the passenger compartment of the vehicle. The air-conditioning loop therefore operates according to a cooling mode, in which an evaporator reduces the temperature of the air flow fed into the passenger compartment, whereas a condenser placed at the front end of the vehicle provides the cooling for the coolant by discharging the calories into an air flow outside of the passenger compartment. The air-conditioning loop also operates in a heating mode, known as heat pump mode, in which the evaporator acts as the condenser by providing heating for the airflow fed into the passenger compartment. The condenser placed at the front end provides the evaporation function, with the outside air flow being cooled by its passage through the condenser at the front end.

The arrangement of the condenser at the front end of the vehicle is a disadvantage. This is because the space available at the front end becomes highly limited due to the installation of other components that are required for the electric power train. It is therefore necessary for the thermal exchanges to be organised differently, whilst providing the heating function and the cooling function using the simplest possible means.

Furthermore, the lifetime and the performance of the electric power train components, particularly the batteries, are conditioned by the temperature of the environment surrounding the component. It is therefore necessary to ensure that these components are maintained at a determined temperature, regardless of the temperature outside of the vehicle. Therefore, at least the heating of these batteries needs to be ensured when this outside temperature drops below a threshold that risks being detrimental to their proper operation.

SUMMARY OF THE INVENTION

Therefore, the object of the invention is a device for the thermal conditioning of a vehicle passenger compartment and of at least one electrical component of an electric power train of said vehicle, comprising a heat transfer fluid circuit, through which a heat transfer fluid passes, and comprising at least:
  a first loop made up of at least a first pump, a heat source and an internal heat exchanger capable of heating the passenger compartment; and
  a second loop parallel to the first loop and interconnected therewith by a first interconnection device, the second loop comprising at least a first exchanger of the electrical component,
the heat source forming the same heat source capable of heating the heat transfer fluid that circulates in the first loop and/or in the second loop.

The two constraints described above form the technical problem on which the invention is based, the invention providing a simple and economical solution that allows both the passenger compartment and the batteries to be heated using one and the same means, which draws its energy in particular from the electrical network of the vehicle.

Such a device is therefore particularly simple to implement as its uses the same component to carry out two distinct or combined heating functions.

According to a first embodiment, the heat source is an electric heat source.

In this case, the electric heat source is installed in the first heat transfer fluid loop immediately upstream of the first interconnection device.

It will be noted that the device according to the invention can comprise a coolant circuit, through which a coolant passes, the coolant circuit comprising at least a compressor and an evaporator.

According to a first feature of the invention, the electric heat source is installed in the first loop immediately upstream of the first interconnection device. The heat transfer fluid thus heated is therefore immediately available for elements that are able to dissipate these calories.

According to a second feature of the invention, the thermal conditioning device comprises a first fluid/fluid heat exchanger, i.e. heat transfer fluid/coolant, installed in the coolant circuit and in the first loop.

In a complementary manner, the thermal conditioning device comprises a second fluid/fluid heat exchanger, i.e. heat transfer fluid/coolant, installed in the coolant circuit and in the second loop.

Each of these exchangers is capable of transferring calories from one fluid to the other, without a forced exchange with an air flow.

In such a case, the first fluid/fluid heat exchanger is arranged to produce a thermal exchange between the heat transfer fluid circulating in the first loop and the coolant circulating in the coolant circuit.

The first fluid/fluid heat exchanger is therefore located in the first heat transfer fluid loop between an outlet of the first pump and an inlet of the electric heat source.

According to a further feature of the invention, the first fluid/fluid heat exchanger is located in the coolant circuit immediately downstream of an outlet of the compressor. This first exchanger therefore acts as a condenser, and more generally as a gas cooler, for the thermodynamic cycle that occurs in the coolant circuit.

The second fluid/fluid heat exchanger is arranged to produce a thermal exchange between the heat transfer fluid circulating in the second heat transfer fluid loop and the coolant circulating in the coolant circuit.

Advantageously, the second fluid/fluid heat exchanger is installed in a branch of the second loop, this branch being parallel to a portion of the second loop that comprises the first electrical component exchanger.

The second heat transfer fluid loop can comprise a second pump installed upstream of the first electrical component exchanger and parallel to a branch of the second loop containing the second fluid/fluid heat exchanger.

In such a situation, the branch is connected to a portion of the second loop which comprises the first electrical component exchanger by a second interconnection device.

According to one embodiment, the coolant circuit comprises a central branch containing the first fluid/fluid heat exchanger, a first lateral branch containing the second fluid/fluid heat exchanger and a second lateral branch containing the evaporator, the central branch, the first lateral branch and the second lateral branch being parallel to each other.

According to a variant of the invention, the device comprises a third heat transfer fluid loop parallel to the second heat transfer fluid loop, said third loop comprising at least a second electrical component exchanger of the electric power train.

In such a situation, the third heat transfer fluid loop comprises a first sector, in which the second electrical component exchanger and a third pump are installed in series, and a second sector comprising a first radiator, the first sector being parallel to the second sector and connected thereto by a third interconnection device.

According to a variant of the invention, the thermal conditioning device comprises a fourth heat transfer fluid loop parallel to the first heat transfer fluid loop, said fourth loop comprising at least a cooling circuit of an internal combustion engine.

In this situation, the fourth heat transfer fluid loop comprises a first portion in which the cooling circuit of the internal combustion engine and a fourth pump are installed in series and a second portion comprising a second radiator, the second portion being parallel to the first portion and connected thereto by a fourth interconnection device.

A first advantage according to the invention resides in the possibility of providing additional calories either to the passenger compartment or to the batteries or to both of these components simultaneously from the same electric heat source carefully installed in the device according to the invention. It is therefore possible to avoid using two additional heat sources dedicated to one or other of these components.

A further advantage resides in the possibility of recovering calories generated by electrical components of the electric power train with a view to using them in the thermodynamic cycle that occurs at the heart of the coolant circuit. This energy recovery provides a hot point with which the coolant can exchange, which takes the form of an increase in the thermal exchange in the condenser. These exchanged calories are then transferred to the heat transfer fluid present in the first loop and then to the air flow fed into the passenger compartment. The calories dissipated by the electrical components are thus available so that they can be made available at the internal air flow.

Further features, details and advantages of the invention will become apparent upon reading the description, which is provided hereafter by way of illustration with reference to the accompanying drawings, in which:

It is noteworthy that the figures describe the invention in a detailed manner for the implementation of the invention; of course, said figures can be used to better define the invention where necessary.

The convention used in FIGS. 2 to 8, which detail the present invention and are described hereafter, is that the circulation of fluid is represented by a continuous line, whereas the absence of circulation of fluid is represented by a dashed line.

DETAILED DESCRIPTION

Throughout the remainder of the description, the terms upstream or downstream are used. These terms relate to the direction of circulation of the relevant fluid in the portion of the circuit that receives the referenced component. The direction of circulation of the coolant and of the heat transfer fluid is shown by the arrows shown on the figures, in accordance with the particular operating mode.

The terms series and parallel are also used to define the positioning of one element relative to another element, particularly portions of the circuit or of the loop, components or heat exchangers. The term parallel is understood to be an arrangement of elements where the relevant fluid that passes through a first element is different to that which passes through a second element, the fluid being of the same type. The term series is understood to be an arrangement of components where the fluid successively passes through the first element and then the second element.

Figure 1:
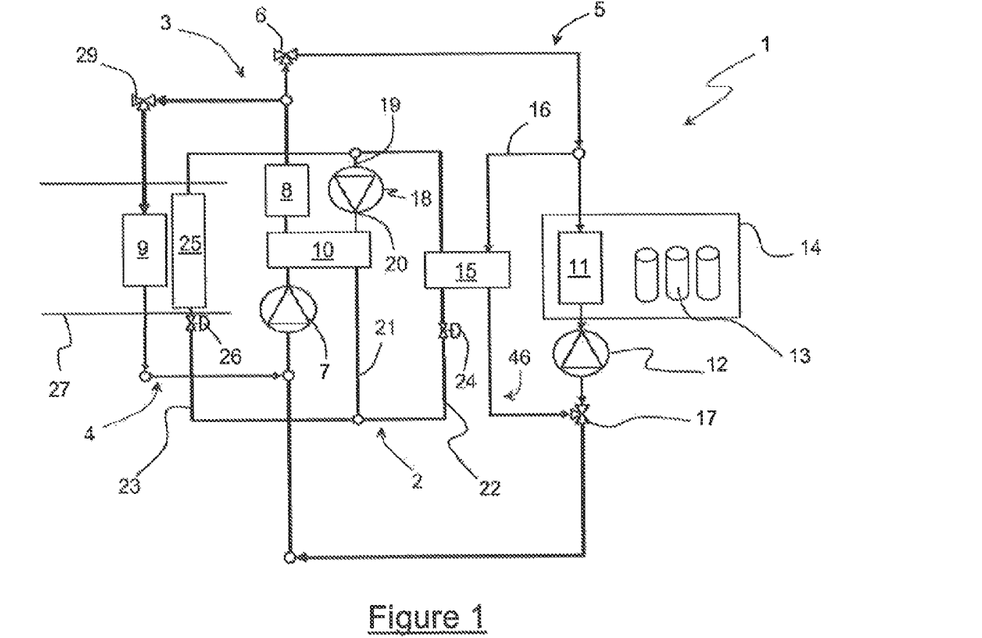
FIG. 1 is a schematic view of the thermal conditioning device according to the invention, not operational.

FIG. 1 shows the thermal conditioning device 1 according to the invention, which device comprises a coolant circuit 2 and a heat transfer fluid circuit 3. Such a thermal conditioning device 1 provides the thermal conditioning of the passenger compartment of a vehicle by heating or cooling said compartment in accordance with a request from a user of the vehicle.

This thermal conditioning device also provides the thermal conditioning of one or more components that make up an electric power train on board the vehicle. In order to achieve this, the heat transfer fluid circuit comprises various thermal exchangers responsible for providing a thermal exchange between the relevant component and the heat transfer fluid that circulates in the heat transfer fluid circuit.

By way of example, the heat transfer fluid is water with added glycol.

The heat transfer fluid circuit 3 is a closed circuit made up of a first heat transfer fluid loop 4 and a second heat transfer fluid loop 5 connected together by a first interconnection device 6. The first interconnection device 6 is produced, for example, in the form of a two-way valve or a three-way valve.

Thus, depending on the operating mode of the thermal conditioning device, the first heat transfer fluid loop 4 and/or the second heat transfer fluid loop 5 can operate independently or jointly.

The first heat transfer fluid loop 4 forms a circuit in which at least a first pump 7, an electric heat source 8 and an internal heat exchanger 9 are located.

The first pump 7 is an electric pump, for example.

The electric heat source 8 forms a heating source designed to heat the heat transfer fluid. According to one embodiment, the electric heat source is an electric radiator, comprising one or more PTC-effect (positive temperature coefficient) heating elements.

The internal heat exchanger 9 is an air/heat transfer fluid thermal exchanger designed to dissipate the calories carried by the heat transfer fluid into the air flow fed inside the passenger compartment. For this reason this thermal exchanger is referred to as "internal" thermal exchanger.

The thermal conditioning device 1 further comprises a first fluid/fluid heat exchanger 10 arranged to produce a thermal exchange between the heat transfer fluid circulating in the first heat transfer fluid loop 4 and the coolant circulating in the coolant circuit 2. Therefore, it is understood that this first fluid/fluid heat exchanger 10 at least partly forms an element of the first heat transfer fluid loop 4.

Advantageously, the first heat transfer fluid loop 4 comprises a stop means 29, the function of which is to allow or to prevent the circulation of heat transfer fluid toward the internal heat exchanger 9. According to one embodiment, such a stop means 29 and the first interconnection device 6 can form the same part installed at a junction of the first heat transfer fluid loop 4 with the second heat transfer fluid loop 5.

The second heat transfer fluid loop 5 is a loop that is installed parallel to the first heat transfer fluid loop 4. The portion of the heat transfer fluid circuit that comprises the first pump 7, the first fluid/fluid heat exchanger 10 and the electric heat source is common to the first loop 4 and to the second loop 5.

This second heat transfer fluid loop 5 comprises a first electrical component exchanger 11 and advantageously a second pump 12 designed to circulate the heat transfer fluid in the second heat transfer fluid loop 5. Advantageously, this second pump is an electric pump.

The first electrical component exchanger 11 exchanges heat between the heat transfer fluid and an electrical component of the electric power train of the vehicle. In particular, this component is a battery 30, or a battery pack 13, reference numeral 14, required to store the electric power used to move the vehicle. According to the embodiment shown, the first electrical component exchanger 11 is incorporated in the battery pack 14 and is directly connected to the second pump 12.

By way of example, the electrical component of the electric power train can be the electric drive motor, a converter in the form of an inverter or a step-down transformer, for example.

The second heat transfer fluid loop 5 further comprises, at least partly, a second fluid/fluid heat exchanger 15 arranged to produce a thermal exchange between the heat transfer fluid circulating in the second loop 5 and the coolant circulating in the coolant circuit 2.

This second fluid/fluid heat exchanger 15 is installed parallel to the first electrical component exchanger 11 and the second pump 12, by means of a branch 16 that bypasses the battery pack 14. The circulation of heat transfer fluid through the second fluid/fluid heat exchanger 15 and/or through the first electrical component exchanger 11 is organised by means of a second interconnection device 17. This device can be formed, in particular, by a two-way or by a three-way valve installed at either one of the junction points between the branch 16 and the portion of the circuit of the second heat transfer fluid loop 5 that comprises the first electrical component exchanger 11. This portion is referred to hereafter as sub-circuit 46.

It is understood from the previous description that the heat transfer fluid that circulates through the electric heat source 8 can circulate according to any one of the following configurations:

only in the first heat transfer fluid loop 4, i.e. toward the internal heat exchanger 9;

only in the second heat transfer fluid loop 5, i.e. toward the first electrical component exchanger 11;

both in the first and in the second heat transfer fluid loop.

The same electric heat source can therefore fulfil the function of heating the passenger compartment and the function of heating the one or more batteries used to power the vehicle.

With regard to the coolant circuit 2, it will be noted that this is a closed loop, inside of which a coolant circulates. This coolant is of the subcritical type such as, for example, a fluorinated compound, particularly R134a, but it can also be a fluid of the supercritical type such as, for example, carbon dioxide, known as R744.

The coolant is circulated within the coolant circuit by a compressor 18, the function of which is to increase the pressure and, at the same time, the temperature of the coolant. The direction of circulation of the coolant is identical regardless of the operating mode of the thermal conditioning device 1 according to the invention, i.e. a cooling mode, a plurality of modes for heating the internal air flow fed into the passenger compartment of the vehicle and a mode for recovering energy from the internal air flow.

The compressor 18 can be a mechanical compressor driven by the internal combustion engine of a hybrid vehicle, but the invention has a particular application in the use of an electric compressor.

This electric compressor is of the high-voltage type, i.e. suitable for operating at a voltage of between 350 Volts and 500 Volts. This compressor is, for example, of the piston, vane or coil type and it can be controlled internally or externally, i.e. on board the compressor or incorporated in a distinct controller of the compressor.

The compressor 18 comprises an inlet hole 19 through which the coolant enters and an outlet hole 20 through which the compressed coolant is discharged. This outlet hole 20 is connected to the first fluid/fluid heat exchanger 10.

This coolant/heat transfer fluid heat exchanger 10 is a thermal exchanger, the function of which is to produce a thermal exchange between the coolant that circulates in the coolant circuit 2 and the heat transfer fluid that circulates in the first heat transfer fluid loop 4. Calories are therefore transferred from one fluid to the other.

Depending on the operating mode, this first fluid/fluid heat exchanger 10 is a condenser, or gas cooler.

The compressor 15 and the first fluid/fluid heat exchanger 10 are installed in a central branch 21 that forms part of the coolant circuit 2. This coolant circuit further comprises a first lateral branch 22 and a second lateral branch 23. It will be noted that the central branch 21, the first lateral branch 22 and the second lateral branch 23 are parallel to each other.

The first lateral branch 22 receives, at least partly, the second fluid/fluid heat exchanger 15. It thus carries out a thermal exchange between the coolant that circulates in the coolant circuit 2 and the heat transfer fluid that circulates in the second heat transfer fluid loop 5.

Advantageously, the first lateral branch 22 further comprises a control component 24 capable, on the one hand, of interrupting the circulation of coolant through the first lateral branch 22 and, on the other hand, of ensuring a reduction in the pressure of the coolant before it enters the second fluid/fluid heat exchanger 15. In this latter case, the regulator 24 becomes an expansion component that can be in the form of a thermostatic expansion valve or an electronic expansion valve. This first regulator 24 is installed upstream, advantageously directly upstream, of the second fluid/fluid heat exchanger 15.

The second lateral branch 23 comprises an evaporator 25 designed to cool the internal air flow, in cooling mode or in a dehumidification mode, for example. This second branch further comprises a second regulator 26 capable, on the one hand, of interrupting the circulation of coolant through the second lateral branch 23 and, on the other hand, of ensuring a reduction in the pressure of the coolant before it enters the evaporator 25. In this latter case, the regulator 26 becomes an expansion component that can be in the form of a thermostatic expansion valve or an electronic expansion valve. This second regulator 26 is installed upstream, advantageously directly upstream, of the evaporator 25.

It will be noted that the evaporator 25 and the internal heat exchanger 9 are both installed inside a casing of a ventilation, heating and/or air-conditioning installation of the vehicle. Such a casing is schematically shown and is referred to by reference numeral 27. This casing channels the internal air flow fed into the passenger compartment of the vehicle.

Figure 2:
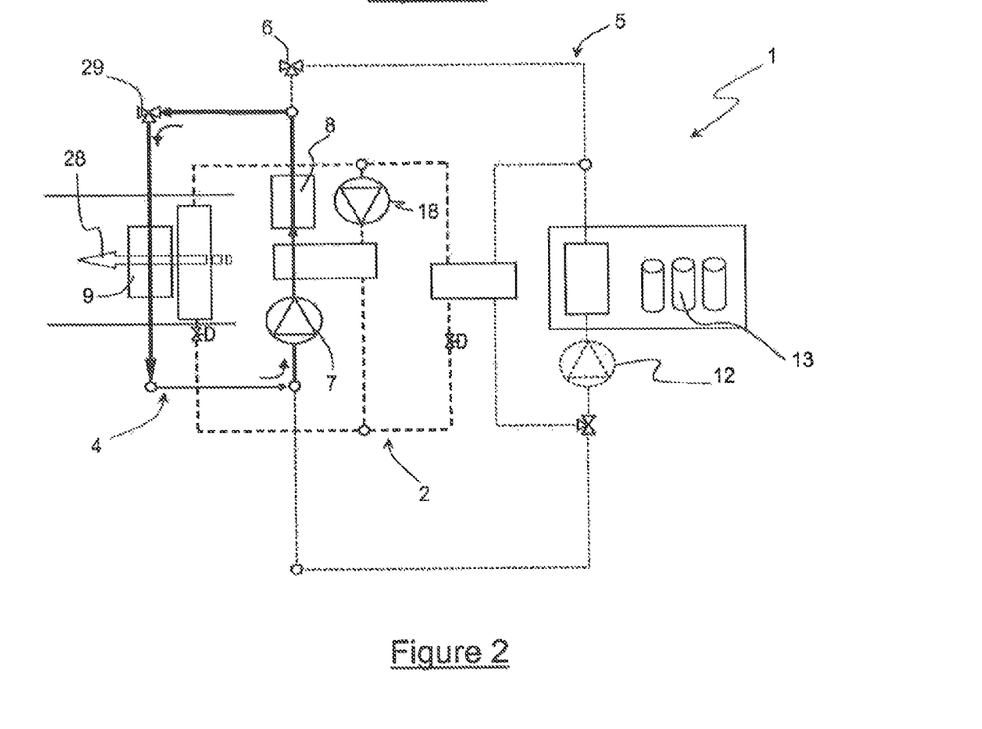
FIG. 2 is a schematic view of the device shown in FIG. 1 used according to a first mode for heating the passenger compartment.

FIG. 2 shows the thermal conditioning device 1 described with reference to FIG. 1, used according to a first mode for heating the passenger compartment. This situation corresponds to the case in which the battery temperature is above a minimum temperature below which it needs to be heated. The first interconnection device 6 is therefore placed in a position in which it prevents any circulation of the heat transfer fluid from the first loop 4 to the second loop 5. The stop means 29 is for its part placed in an open position, which allows the circulation of heat transfer fluid through said stop means and toward the internal heat exchanger 9.

The first pump 7 and the electric heat source 8 are then actuated. The calories generated by the electric heat source 8 are collected by the heat transfer fluid and carried toward the internal heat exchanger 9. This internal heat exchanger dissipates these calories into the internal air flow 28 when said air flow passes through the body of this exchanger. The internal air flow 28 heated in this manner is then sent toward the passenger compartment so as to perform the passenger compartment heating function.

It will be noted that the second pump 12 is inactive, thus preventing any thermal exchange at the first electrical component exchanger 11.

The compressor 18 is also rendered inactive, thus blocking any circulation of coolant within the coolant circuit 2.

Figure 3:
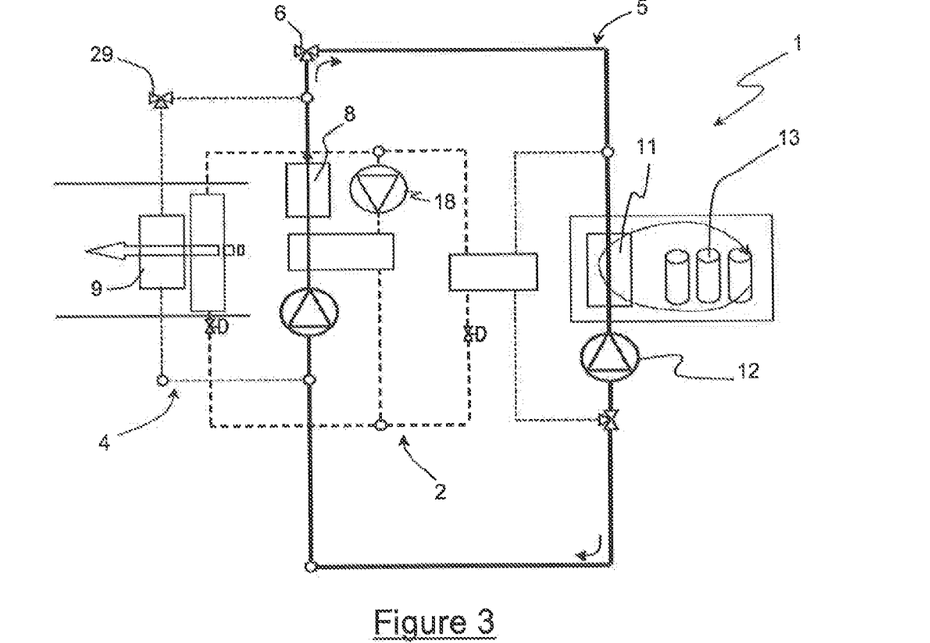
FIG. 3 is a schematic view of the device shown in FIG. 1 used according to a mode for heating an electrical component.

FIG. 3 shows the thermal conditioning device 1 in a heating mode exclusive of the one or more batteries 13. Such a situation corresponds to the case in which the temperature of the passenger compartment is at least equal to the request of the user of the vehicle, whereas the temperature of the battery is below a threshold temperature, thus requiring an addition of calories. The first interconnection device 6 is thus placed in a position where it allows the circulation of heat transfer fluid toward the first electrical component exchanger 11. The stop means is for its part placed in a closed position, which prevents the circulation of heat transfer fluid toward the internal heat exchanger 9.

The first pump 7 and/or the second pump 12 are actuated so as to circulate the heat transfer fluid within the second heat transfer fluid loop 5. The electric heat source 8 in this case is the same heat source as that used to heat the air flow fed into the passenger compartment, and it is also actuated so as to generate calories.

The calories generated by the electric heat source 8 are collected by the heat transfer fluid and carried toward the first electrical component exchanger 11. This exchanger dissipates these calories in a fluid, reference numeral 30, that provides a thermal exchange between the first electrical component exchanger 11 and the one or more batteries 13. Such a fluid is air, for example, but it can also be a liquid fluid.

The heating function of the component of the electric power train of the vehicle is therefore provided using a simple means, which is also used to heat the passenger compartment.

The compressor 18 is inactive, thus blocking any circulation of coolant within the coolant circuit 2.

Figure 4:
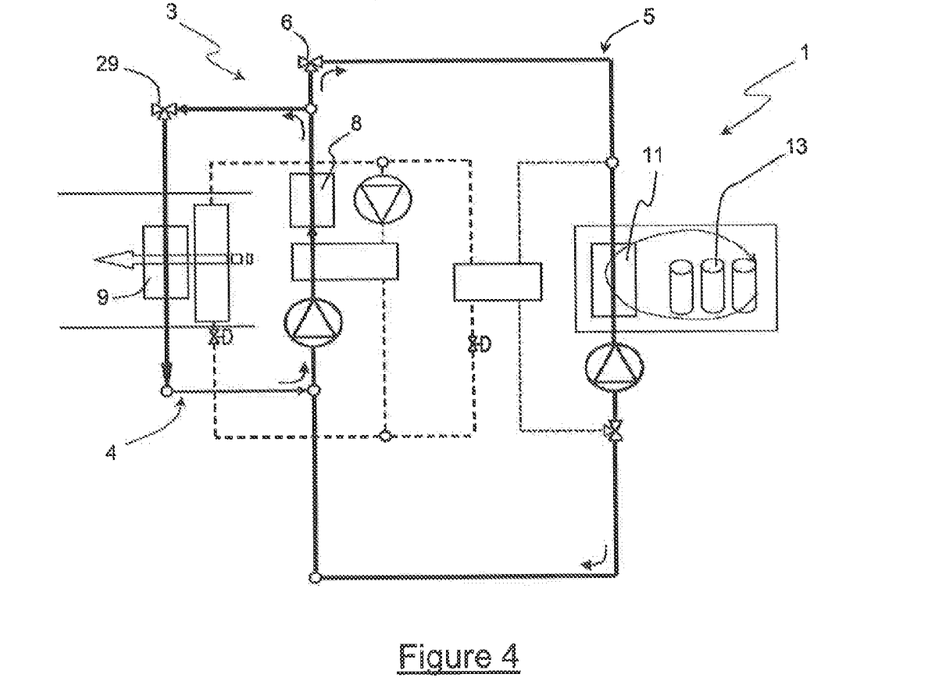
FIG. 4 is a schematic view of the device shown in FIG. 1 that combines the use according to the first mode for heating the passenger compartment and according to the mode for heating an electrical component.

FIG. 4 shows the thermal conditioning device 1 in a combined heating mode, in this sense it simultaneously, and using the same electric heat source, provides heating for the passenger compartment and for the component of the electric power train, in this case the one or more batteries 13.

Such a situation corresponds to the case in which the temperature of the passenger compartment and the temperature of the electrical component of the power train are lower, on the one hand, than the request of the user of the vehicle and, on the other hand, than the minimum temperature threshold for maintaining the reliability of the component, in this case the battery 13. The first interconnection device 6 is therefore placed in a position where it allows the circulation of heat transfer fluid toward the first electrical component exchanger 11. The stop means 29 is open, so as to allow the circulation of the heat transfer fluid within the first heat transfer fluid loop 4.

The electric heat source 8 is actuated so as to dissipate calories in the heat transfer fluid and the heat transfer fluid circuit 3 is arranged to distribute this heat transfer fluid both toward the internal heat exchanger 9 and toward the first electrical component exchanger 11.

The first pump 7 and/or the second pump 12 are actuated so as to circulate the heat transfer fluid within the first heat transfer fluid loop 4 and within the second heat transfer fluid loop 5. The electric heat source 8 in this case is the same heat source that provides the energy for heating the passenger compartment and for heating the one or more batteries 13.

The compressor 18 is inactive, thus blocking any circulation of coolant within the coolant circuit 2.

FIGS. 5 to 8 show a first variant of the thermal conditioning device 1. This variant uses the structure described with reference to FIGS. 1 to 4 and completes said structure by the addition of electrical components that relate to the electric power train and of components that relate to a thermal power train.

The following description is limited to these additions and reference should be made to the description that refers to FIGS. 1 to 4 for identical elements and their organisation.

The heat transfer fluid circuit 3 is completed by a third heat transfer fluid loop 30 and/or a fourth heat transfer fluid loop 31.

The third heat transfer fluid loop 30 is installed parallel to the first heat transfer fluid loop 4 and to the second heat transfer fluid loop 5. It is connected to the heat transfer fluid circuit 3 at the first connection device 6 and at a connection point located between the first pump 7 and the second interconnection point 17.

This third heat transfer fluid loop 30 comprises at least a second electrical component exchanger 32 of the electric power train. Such a second exchanger thermally exchanges with an electrical component of the electric power train, said component being, for example, the electric drive motor, an AC-DC converter or a DC-DC voltage converter, with said DC-DC voltage converter in particular forming a step-down transformer.

This second electrical component exchanger 32 is an exchanger that is distinct from the first electrical component exchanger 11. It is installed in a first sector 33 that forms part of the third heat transfer fluid loop 30 in series with a third pump 34, which is an electric pump in particular, which pump ensures the circulation of heat transfer fluid in the third loop 30.

Advantageously, the third heat transfer fluid loop 30 further comprises a third electrical component exchanger 38 and a fourth electrical component exchanger 39 forming part of the electric power train.

By way of a preferred embodiment, the first exchanger 11 is assigned to the thermal conditioning of at least one battery 13 of the power train, the second exchanger 32 is assigned to the thermal conditioning of the electric drive motor, the third exchanger 38 is assigned to the thermal conditioning of the AC-DC converter and the fourth exchanger 39 is assigned to the DC-DC voltage converter, said converter forming a step-down transformer.

This third heat transfer fluid loop 30 further comprises a second sector 35 comprising a first radiator 36. This radiator forms an air/heat transfer fluid thermal exchanger and its function is to dissipate, into the air outside of the passenger compartment, calories present in the heat transfer fluid that circulate in the third heat transfer fluid loop 30.

It will be noted that the second sector 35 is parallel to the first sector 33. These two sectors are connected to each other by a third interconnection device 37, the function of which is to manage the circulation of heat transfer fluid in the first sector 33 and/or in the second sector 35. By way of example, this is a three-way valve installed at an intersection between the first sector 33 and the second sector 35. It can also be two two-way valves, each installed in a respective sector. Finally, the third interconnection device 37 can be in the form of a single, two-way valve installed in the second sector 35.

The fourth heat transfer fluid loop 31 is installed parallel to the first heat transfer fluid loop 4. It is connected to said loop via the stop means 29 and via a connection point located downstream of the internal heat exchanger 9 and upstream of the first pump 7.

The fourth heat transfer fluid loop 31 comprises at least one internal combustion engine 41. It will therefore be understood that the heat transfer fluid circulating in this fourth loop circulates within a cooling circuit of the internal combustion engine, particularly through its cylinder head.

This circulation is produced by means of a first portion 40 of the fourth loop 31, in which the cooling circuit of the internal combustion engine 41 and a fourth pump 42 for circulating heat transfer fluid in the fourth loop 31 are installed in series. Such a fourth pump can be an electric pump. Alternately, it can be a mechanical pump, i.e. driven by the internal combustion engine 41.

The fourth heat transfer fluid loop 31 further comprises a second portion 43, in which a second radiator 44 is installed, said radiator forming an air/heat transfer fluid thermal exchanger. The function of this second radiator 44 is to dissipate into the air outside the passenger compartment calories present in the heat transfer fluid that circulates in the fourth heat transfer fluid loop 31.

The first portion 40 and the second portion 43 are installed parallel to each other and are connected to each other, on the one hand, by a fourth interconnection device 45 located downstream of the internal combustion engine 41 and, on the other hand, by a connection point located upstream of the fourth pump 42.

Figure 5:
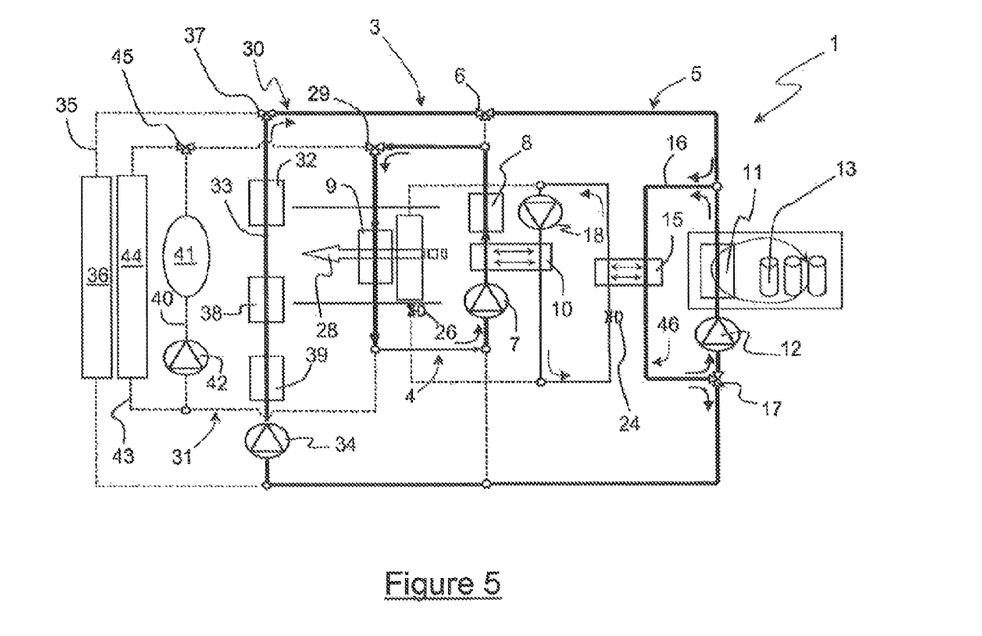
FIG. 5 is a schematic view of the thermal conditioning device according to a first variant, used according to a second mode for heating the passenger compartment.

The operating mode shown in FIG. 5 will now be described. This operating mode corresponds to a second mode for heating the passenger compartment which can form an alternative or an addition to the first heating mode by means of the electric heat source 8, as described with reference to FIGS. 1 to 4.

The coolant circuit operates in heat pump mode. The compressor 18 increases the pressure and the temperature of the coolant. The coolant, the temperature and the pressure of which have thus been increased, passes through the first fluid/fluid heat exchanger 10. The coolant then transfers its calories to the heat transfer fluid that circulates through this first fluid/fluid heat exchanger 10. The actuation of the first pump 7 allows these calories to be carried toward the internal heat exchanger 9, which in turn transfers these calories to the internal air flow 28.

The first regulator 24 is placed in a position where it reduces the pressure of the coolant before it enters the second fluid/fluid heat exchanger 15, eventually returning to the compressor 18.

The second regulator 26 is placed in a closed position where it prevents the circulation of coolant toward the evaporator 25.

With regard to the heat transfer fluid circuit 3, it will be observed that the first heat transfer fluid loop 4 is isolated from the second heat transfer fluid loop 5 and from the third heat transfer fluid loop 30. This isolation is produced by the first interconnection device 6 which is placed in a position where the heat transfer fluid present in the first loop 4 does not encounter the coolant present in the second loop 5.

This first interconnection device 6 is also placed in a position where it allows the heat transfer fluid present in the second loop 5 to be mixed with that which is present in the third loop 30. The circulation of the heat transfer fluid in these loops is implemented by the actuation of one and/or other of the second or third pumps, reference numerals 12 and 34 respectively.

The calories that are collected at the second exchanger 32 and/or at the third exchanger 38 and/or at the fourth exchanger 39 are carried by the heat transfer fluid toward the second fluid/fluid heat exchanger 15.

The calories generated at the first component are also collected by the first heat exchanger 11 and are sent toward the second fluid/fluid heat exchanger 15.

The calories that are thus present in the heat transfer fluid that circulates in the branch 16 are transferred to the coolant by the second fluid/fluid heat exchanger 15, which helps to increase its temperature. The first fluid/fluid heat exchanger 10 thus forms the hot point of the heat pump cycle, whereas the second fluid/fluid heat exchanger 15 forms the cold point of this cycle. The calories generated by the electrical components of the electric power train are thus carefully used to increase the efficiency of the thermodynamic cycle.

It will be noted that the direction of circulation in the sub-circuit 46 is opposite to the direction of circulation of the heat transfer fluid in the second loop 5. The heat transfer fluid arriving from the first electrical component exchanger 11 combines with the heat transfer fluid arriving from the first interconnection device 6 so as to jointly supply the second fluid/fluid heat exchanger 15.

After the passage of the heat transfer fluid in this second fluid/fluid heat exchanger 15, the heat transfer fluid is split into two by the second interconnection device 17, a portion being directed toward the second pump 12 and another portion being directed toward the first pump 7.

According to this embodiment, there is a transfer of energy from the exchangers 15 and 10 to the internal exchanger 9.

Figure 6:
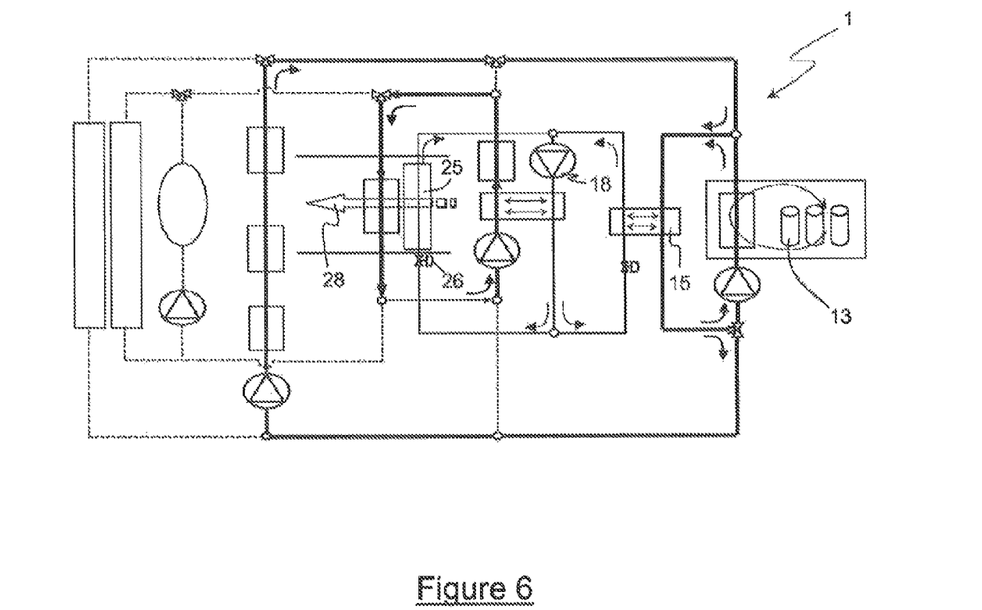
FIG. 6 is a schematic view of the thermal conditioning device according to the first variant, used according to a third mode for heating the passenger compartment.

FIG. 6 shows the first variant of the thermal conditioning device 1 used according to a third mode for heating the passenger compartment. Reference will be made to the detailed description of FIG. 5, the following description being limited to the differences.

This third mode is a mode for recovering the heat present in the passenger compartment combined with the second heating mode described above. In this third heating mode, the second regulator 26 is placed in a position where it provides pressure relief for the coolant fed into the evaporator 25. The internal air flow 28 in this case is a flow of recirculated air, i.e. that exclusively or in large part originates from the passenger compartment. In such a case, this air flow is hot, which helps to heat the coolant that circulates in the evaporator 25.

The portion of coolant that circulated in the evaporator 25 combines with the portion of coolant that circulated in the second fluid/fluid heat exchanger 15 so as to return to the compressor 18.

In addition to recovering the calories generated by the electrical components of the electric power train, this heating mode recovers the calories present in the internal air flow, which helps to improve the efficiency of the heat pump.

Figure 7:
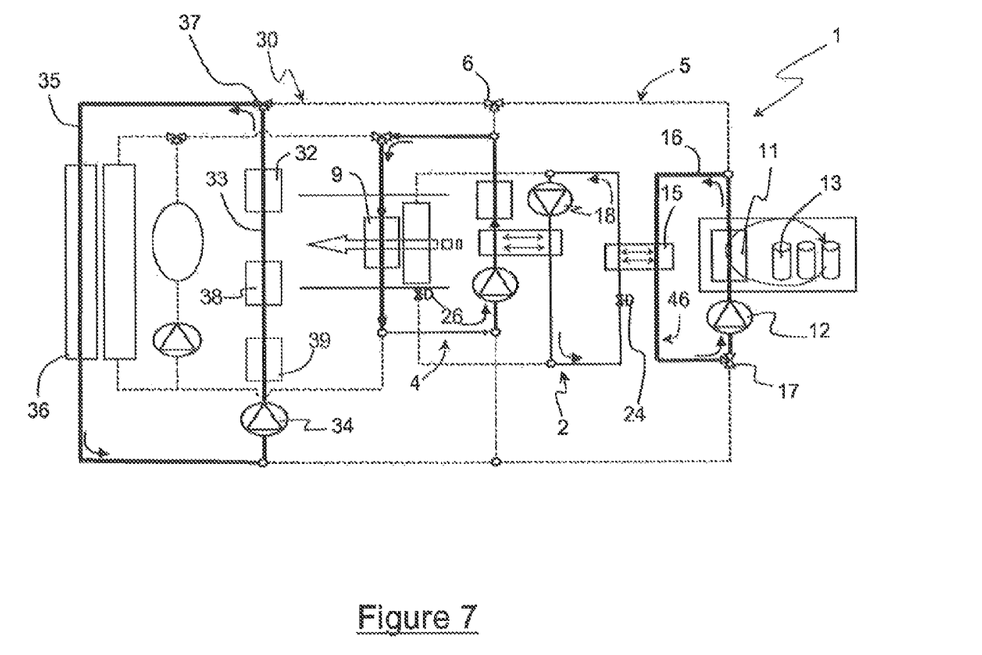
FIG. 7 is a schematic view of the thermal conditioning device according to the first variant, used according to a fourth mode for heating the passenger compartment.

FIG. 7 shows the first variant of the thermal conditioning device 1 used according to a fourth mode for heating the passenger compartment.

According to this fourth heating mode, the third heat transfer fluid loop 30 is isolated from the second heat transfer fluid loop 5. This isolation is produced by the third interconnection device 37 placed in a position where it prevents the heat transfer fluid present in the third loop 30 from being mixed with the heat transfer fluid present in the second heat transfer fluid loop 5.

Advantageously, the third pump 34 is actuated so that the heat transfer fluid circulates in the first sector 33, so as to collect the calories present at the second exchanger 32 and/or at the third exchanger 38 and/or at the fourth exchanger 39. This circulation also occurs in the second sector and through the first radiator 36.

It is thus possible to cool the electrical components of the electric power train by dissipating the calories into the air outside of the passenger compartment.

In an identical manner to the modes described with reference to FIG. 5 or 6, the first heat transfer fluid loop 4 is isolated from the second heat transfer fluid loop 5.

In this fourth heating mode, the second loop 5 is used in part. This is because the heat transfer fluid circulates in the sub-circuit 46 comprising the second pump 12, the first electrical component exchanger 11 and the branch 16. This circulation takes place by the actuation of the second pump 12 and by the fact that the second interconnection device 17 is placed in a position where it prevents the heat transfer fluid from being directed toward the rest of the second heat transfer fluid loop 5, i.e. toward the third pump 34.

In this situation, the heat transfer fluid that circulates in this sub-circuit 46 collects calories at the electrical component, for example, the battery 13, and carries them toward the second fluid/fluid heat exchanger 15.

The first regulator 24 is placed in a position where it releases the pressure of the coolant before it enters the second fluid/fluid heat exchanger 15, eventually returning to the compressor 18.

The second regulator 26 is placed in a closed position where it prevents the circulation of coolant toward the evaporator 25.

The calories present in the heat transfer fluid are thus transferred to the coolant so as to form the cold point of the heat pump implemented by the coolant circuit 2. The transfer of these calories toward the internal heat exchanger 9 then occurs as described above, and on this matter reference will be made to the description with reference to FIG. 5.

Figure 8:
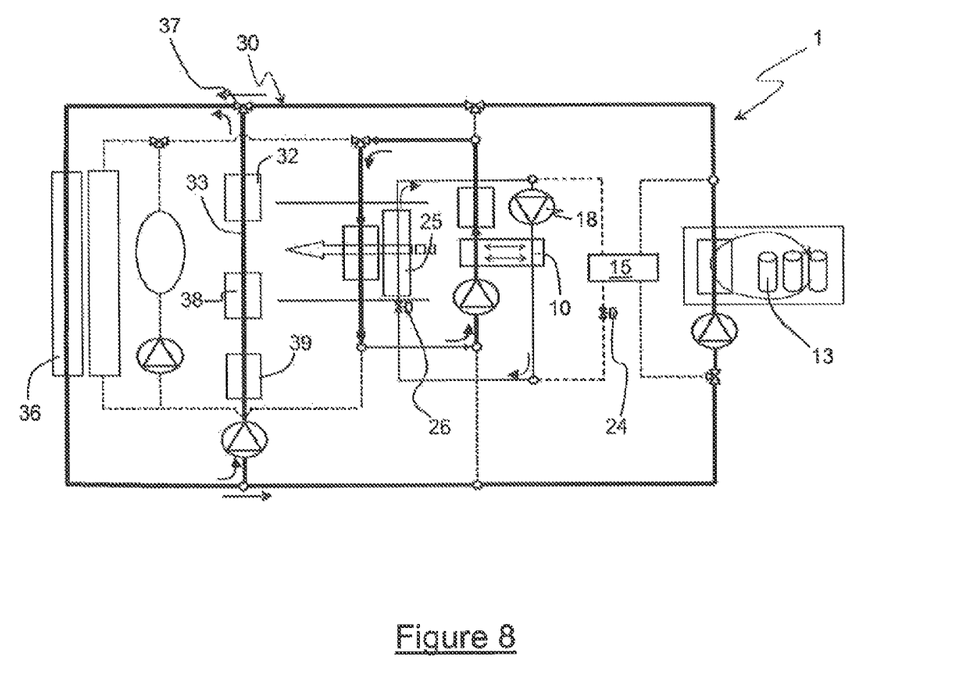
FIG. 8 is a schematic view of the thermal conditioning device according to the first variant, used according to a fifth mode for heating the passenger compartment.

FIG. 8 shows the first variant of the thermal conditioning device 1 used according to a fifth heating mode. This fifth mode for heating the passenger compartment is based exclusively on the recovery of calories present in the internal air flow 28.

The electrical components of the electric power train for their part are put in contact so as to dissipate their calories into the air flow outside of the passenger compartment. In order to achieve this, the third loop is brought into communication with the second heat transfer fluid loop 5. The third interconnection device 37 is placed in a position where it allows the mixing of the heat transfer fluid originating from the second loop 5 with the heat transfer fluid originating from the first sector 33.

The calories collected at the first electrical component exchanger 11 as well as the calories collected at the second, third and fourth electrical component exchangers are transferred to the external air flow by thermal exchange in the first radiator 36.

The first heat transfer fluid loop 4 is isolated from the second heat transfer fluid loop 5 in an identical manner to the solutions described with reference to FIGS. 5 to 7.

The first regulator 24 is placed in a position where it prevents the circulation of coolant toward the second fluid/fluid heat exchanger 15.

The second regulator 26 is placed in a position where it relieves the pressure of the coolant before it enters the evaporator 25, before finally returning to the compressor 18. An internal recirculated air flow passes through the evaporator 25, the temperature of said air flow being higher than the temperature of the coolant entering the evaporator 25.

The evaporator 25 thus forms the cold point of the heat pump whereas the first fluid/fluid heat exchanger 10 forms the hot point of this heat pump.

The invention claimed is:

1. A device (1) for the thermal conditioning of a vehicle passenger compartment and part of at least one electrical component (13) of an electric power train of a vehicle, comprising a heat transfer fluid circuit (3) through which a heat transfer fluid passes and comprising at least:
a first heat transfer fluid loop (4) made up of at least a first pump (7), a heat source and an internal heat exchanger (9) capable of heating the vehicle passenger compartment; and
a second heat transfer fluid loop (5) parallel to the first loop (4) and interconnected therewith by a first interconnection device (6), the second loop (5) comprising a first exchanger (11) of the electrical component (13),
the heat source capable of heating the heat transfer fluid that circulates in the first heat transfer fluid loop (4) and in the second heat transfer fluid loop (5), wherein the heat source is installed in the first heat transfer fluid loop (4) immediately upstream of the first interconnection device (6) such that the first heat transfer fluid loop (4) is configured to allow the heat transfer fluid to flow from the heat source directly to the first interconnection device (6) during operation.

2. The device according to claim 1, wherein the heat source is an electric heat source (8).

3. The device according to claim 1, comprising a coolant circuit (2), through which a coolant passes, the coolant circuit (2) comprising at least a compressor (18) and an evaporator (25).

4. The device according to claim 3, comprising a first fluid/fluid heat exchanger (10) installed in the coolant circuit (2) and in the first heat transfer fluid loop (4).

5. The device according to claim 4, wherein the first fluid/fluid heat exchanger (10) is arranged to produce a thermal exchange between the heat transfer fluid circulating in the first heat transfer fluid loop (4) and the coolant circulating in the coolant circuit (2).

6. The device according to claim 4, wherein the first fluid/fluid heat exchanger (10) is located in the first heat transfer fluid loop (4) between an outlet of the first pump (7) and an inlet of the electric heat source (8).

7. The device according to claim 4, wherein the first fluid/fluid heat exchanger (10) is located in the coolant circuit (2) immediately downstream of an outlet of the compressor (18).

8. The device according to claim 4, comprising a second fluid/fluid heat exchanger (15) installed in the coolant circuit (2) and in the second heat transfer fluid loop (5).

9. The device according to claim 8, wherein the second fluid/fluid heat exchanger (15) is arranged to produce a thermal exchange between the heat transfer fluid circulating in the second heat transfer fluid loop (5) and the coolant circulating in the coolant circuit (2).

10. The device according to claim 8, wherein the second fluid/fluid heat exchanger (15) is installed in a branch (16) of the second loop (5) parallel to a portion of the second loop (5) that comprises the first exchanger (11) of the electrical component (13).

11. The device according to claim 8, wherein the coolant circuit (2) comprises a central branch (21) containing the first fluid/fluid heat exchanger (10), a first lateral branch (22) containing the second fluid/fluid heat exchanger (15) and a second lateral branch (23) containing the evaporator (25), the central branch (21), the first lateral branch (22) and the second lateral branch (23) being parallel to each other.

12. The device according to claim 8, wherein the second heat transfer fluid loop (5) comprises a second pump (12) installed upstream of the first exchanger (11) of the electrical component (13) and parallel to a branch (16) containing the second fluid/fluid heat exchanger (15).

13. The device according to claim 12, wherein the branch (16) is connected to a portion of the second loop (5), the portion of the second loop comprising the first exchanger (11) of the electrical component (13) by a second interconnection device (17).

14. The device according to claim 1, wherein a third heat transfer fluid loop (30) is provided parallel to the second heat transfer fluid loop (5), the third heat transfer fluid loop (30) comprising at least a second electrical component exchanger (32) of the electric power train.

15. The device according to claim 14, wherein the third heat transfer fluid loop (30) comprises a first sector (33), in which at least the second electrical component exchanger (32) and a third pump (34) are installed in series, and a second sector (35) comprising a first radiator (36), the first sector (33) being parallel to the second sector (35) and connected thereto by a third interconnection device (37).

16. The device according to claim 14, wherein a fourth heat transfer fluid loop (31) is provided parallel to the first heat transfer fluid loop (4), said fourth loop (31) comprising at least one cooling circuit of an internal combustion engine (41).

17. The device according to claim 16, wherein the fourth heat transfer fluid loop (31) comprises a first portion (40) in which the cooling circuit of the internal combustion engine (41) and a fourth pump (42) are installed in series, and a second portion (43) comprising a second radiator (44), the second portion (43) being parallel to the first portion (40) and connected thereto by a fourth interconnection device (45).

* * * * *